United States Patent [19]

Kemp, Jr.

[11] 4,361,354

[45] Nov. 30, 1982

[54] DOOR HOLDING DEVICE

[76] Inventor: Merle L. Kemp, Jr., 44 Locust St., Prophetstown, Ill. 61277

[21] Appl. No.: 205,732

[22] Filed: Nov. 10, 1980

[51] Int. Cl.³ ............................................. B62D 25/00
[52] U.S. Cl. .................................... 296/1 C; 292/338
[58] Field of Search ............ 296/1 C, 97 G; 292/338, 292/339, DIG. 15; 16/227, 267, 268, 260

[56] References Cited

U.S. PATENT DOCUMENTS

| | | | |
|---|---|---|---|
| 4,090,732 | 5/1978 | Vistitsky | 296/97 G |
| 4,167,287 | 9/1979 | Franklin, Jr. | 296/97 G |
| 4,236,746 | 12/1980 | La Voie | 296/1 C |

Primary Examiner—Robert R. Song
Attorney, Agent, or Firm—Edmond T. Patnaude

[57] ABSTRACT

A stop member is hingedly mounted to a base member which clips onto a vehicle license plate of the type which is pivotably mounted to a vehicle and functions as an external cover which hides the usual fuel tank cap and fill port. After the license plate has been swung into an open position the stop member can be pivoted from an inoperative position, wherein it lies parallel to the rear face of the license plate, to an operative position wherein it lies in a plane perpendicular to that of the license plate and abuts the rear wall of the vehicle to hold the plate in a open position.

5 Claims, 4 Drawing Figures

DOOR HOLDING DEVICE

The present invention relates in general to a device for holding a spring loaded door or cover in an open position, and it relates in particular to such a device which is adapted for use with a door or cover used to hide the usual fuel tank cap and fill port of an automotive vehicle.

BACKGROUND OF THE INVENTION

For esthetic and other reasons, many automotive vehicles are designed so that the rear license plate functions as a door which covers the fuel tank cap. In other cases a separate door is used for the same purpose, and like the license plate door, it is spring biased into a closed position over the tank cap. With both of these designs the door must be held against the force of the return spring while the fuel tank is being filled. Not only is this inconvenient but it frequently results in spillage of fuel when the tank is being filled.

SUMMARY OF THE INVENTION

Briefly, there is provided in accordance with the present invention a new and improved hold-open device which has a base portion adapted to be attached to the license plate or other door and which has a thin, generally flat stop member hingedly mounted to the base for swinging movement between an inoperative position wherein it lies flat against the rear face of the door or license plate and an operative position wherein it is perpendicular thereto. The stop member can only be moved into the operative position while the door is fully open, and when the door is released the stop member then abuts the wall of the vehicle adjacent the fuel tank port and cap to hold the door in an open position against the force of the return spring.

In a preferred embodiment of the invention the base member clips onto the license plate so as to be readily mounted thereon without the need for separate fasteners and without using any tools.

GENERAL DESCRIPTION OF THE DRAWINGS

The present invention will be better understood by a reading of the following detailed description taken in connection with the accompanying drawings wherein.

DETAILED DESCRIPTION OF THE INVENTION

Figure 1:
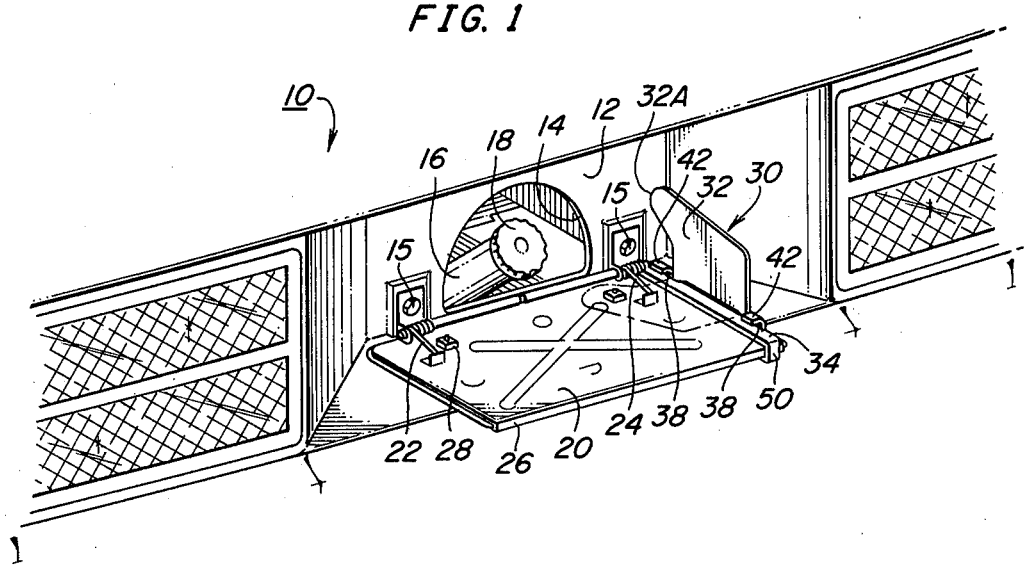
FIG. 1 is a perspective view of a portion of an automotive vehicle showing the device of the present invention in an operative position holding a license plate type door in an open position.

Referring now to the drawing and particularly to FIG. 1 thereof, a portion of the rear end of an automobile 10 may be seen to include a vertical rear wall 12 having an opening 14 therein exposing the fill port 16 of the fuel tank (not visible) of the vehicle. A fuel cap 18 is removably and sealably fitted over the fill port in the usual manner.

A door-like bracket plate 20 is hingedly mounted to the wall 12 below the opening 14 by a pair of bolts 15, and the plate 10 is biased into a closed position against the wall 12 by means of a pair of coil springs 22 and 24. A license plate 26 is suitably mounted to the exposed face of the bracket plate 20 (bottom as viewed in FIG. 1) by a pair of nut and bolt assemblies 28.

As thus far described, the system is conventional although in some cases the bracket plate 20 is replaced by brackets of other configurations, but in all cases the license plate substantially covers the rear face or faces of the bracket. It will thus be seen that the springs 22 bias the bracket and accompanying license plate into a vertical position wherein the wall 12 is substantially covered by the license plate which thus hides the fill port and fuel cap.

In order to hold the bracket and license plate assembly in a fully open position while the fuel tank is being filled, there is provided in accordance with the present invention a hold open device 30 which is attached to the license plate 26 and bracket plate 20 and which has a stop member 32 movable between an operable position as shown in solid lines in FIG. 1 and an inoperative position as shown in phantom in FIG. 1. The stop member 32 can also be swung into another inoperative position 180° from the illustrated inoperative position. Consequently, the device 30 may be mounted to the license plate on either side of the fuel fill opening.

When in the operative position the rear edge of the stop member abuts the wall 12 and thereby prevents the bracket and license plate from swinging into a closed position against the wall 12. When in the inoperative position the member 32 lies flat against the rear face of the bracket 20 whereby the springs may swing the bracket and license plate into the vertical position.

Figure 2:
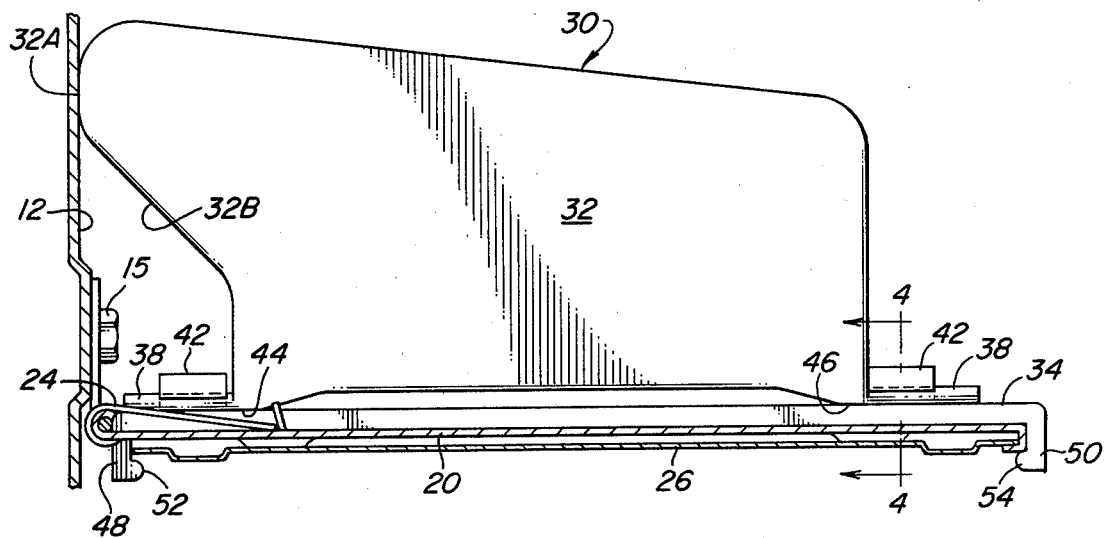
FIG. 2 is an elevational view partly in cross-section of the assembly of FIG. 1.
Figure 3:
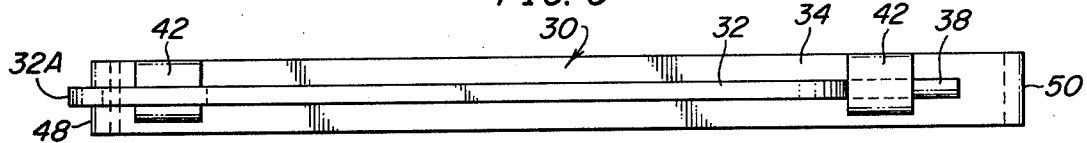
FIG. 3 is a plan view taken from the top of FIG. 1.
Figure 4:
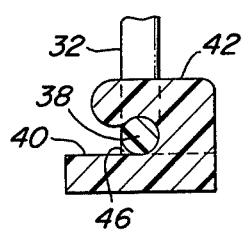
FIG. 4 is a cross-sectional view taken along the line 4—4 in FIG. 2.

Considered in greater detail, the hold-open device 30 includes a base member 34, which may be a plastic molding, and the stop member 32 which is hingedly connected thereto. The stop member 32 is generally flat and has a rearwardly extending upper portion (as shown in FIG. 1) having an abutment edge 32A. The member 32 has two integral hinge pins 38 at the bottom which are snap fitted into a pair of slots 40 respectively provided in upstanding lug portions 42 on the rear of the base member 34. As best shown in FIGS. 2 and 4, it will be seen that the stop member 32 is provided with flat bottom edge surfaces 44 and 46 which abut the rear face of the base member 34 when the stop member 32 is in the operative position. The base member 34 is sufficiently flexible so that the member may be pivoted between the operative and inoperative positions while providing a detent to hold it in either position. The member 32 has a recess 32B at the rear to provide clearance for the lug 42 and the mounting assembly for the bracket 20.

The base member 34 has flanges 48 and 50 at the respective ends thereof and these flanges are provided with reentrant lips 52 and 54 at the ends thereof. Inasmuch as license plates in the United States are six inches high, flanges 48 and 50 are spaced six inches apart thereby to enable the base member to be slipped onto the license plate from one end thereof. The lips 52 and 54 are relatively short so as not to cover any significant amount of the outer face of the license plate and yet secure the hold open device 30 thereto.

It will thus be seen that the device 30 is inexpensive to manufacture and may be installed on a vehicle without using any tools or additional fastening devices. If desired, however, other means such as a bonding agent may be used to attach the base member to the bracket and license plate assembly.

OPERATION

In order to use the device 30, the bracket and license plate is swung away from the wall 12 and the base member is clipped thereon either by sliding it onto the end of the plate or by hooking one flange over one edge of the plate and pressing the other flange and reentrant lip against the plate to cause the flange to spring outwardly and then snap back in place against the plate. The stop member 32 may be affixed to the base member either before or after it is assembled to the plate.

Thereafter, with the door bracket 20 fully open, the stop member 32 may be swung into the operative position so that when the door is released, the edge 32A abuts the wall 12 to restrict the door from closing any further. The detent action of the edges 44 and 46 against the base member 34 prevents the stop member from spuriously moving out of the operative stop position.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A device of the type described for use with a plate-like door hingedly mounted to an automotive vehicle for movement between a closed position covering the fuel fill port of the vehicle and an open position exposing the port, comprising a base member having means thereon for attaching said base member to said plate-like door, said base member having a portion disposed on the rear side of said door, a stop member hingedly mounted to said portion of said base member for movement between a first position wherein it lies substantially coplanar with said door and a second position wherein it lies substantially perpendicular to the plane of said door, said stop member having a flat edge surface which abuts said base member when said stop member is in said second position, and spring means resiliently urging said flat edge surface against said base member to prevent spurious movement of said stop member out of said second position.

2. A device according to claim 1 wherein said door is a license plate, and said reentrant end portions are spaced apart by six inches.

3. A device according to claim 1 wherein one of said members includes a pair of mutually aligned, integral hinge pins, and the other of said members includes a pair of slotted portions pivotably receiving said hinge pins.

4. A device according to claim 3 wherein said other of said members is plastic, and said hinge pins are snap fitted into assembled relationship with said other of said members.

5. A device according to claim 1 wherein said stop member is mounted to said base member by hinge means integral with said base member, said base member and said hinge means being a single plastic molding including said hinge means.

* * * * *